(12) United States Patent
Zhou et al.

(10) Patent No.: US 7,412,597 B2
(45) Date of Patent: Aug. 12, 2008

(54) COMPUTER SYSTEM AND BOOTING METHOD THEREOF

(75) Inventors: Jianxin Zhou, Taipei Hsien (TW); Jiangbo Wang, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 311 days.

(21) Appl. No.: 11/163,217

(22) Filed: Oct. 11, 2005

(65) Prior Publication Data

US 2007/0033388 A1 Feb. 8, 2007

(30) Foreign Application Priority Data

Aug. 8, 2005 (TW) .............................. 94126830 A

(51) Int. Cl.
- *G06F 9/00* (2006.01)
- *G06F 15/177* (2006.01)
- *G06F 9/24* (2006.01)
- *G06F 1/24* (2006.01)

(52) U.S. Cl. .................. 713/2; 713/1; 713/100

(58) Field of Classification Search ............ 713/1, 713/2, 100
See application file for complete search history.

(56) References Cited

U.S. PATENT DOCUMENTS

| | | | |
|---|---|---|---|
| 4,621,326 A * | 11/1986 | Rawlins | 705/43 |
| 5,640,563 A | 6/1997 | Carmon | |
| 5,721,922 A * | 2/1998 | Dingwall | 718/103 |
| 6,408,324 B1 * | 6/2002 | Wallace et al. | 718/107 |
| 6,842,812 B1 | 1/2005 | Roth et al. | |
| 6,907,606 B1 * | 6/2005 | Jang | 718/103 |
| 2004/0088531 A1 * | 5/2004 | Rothman | 713/1 |
| 2004/0216100 A1 * | 10/2004 | Bower, III | 718/100 |
| 2005/0102650 A1 * | 5/2005 | Kalman | 717/100 |
| 2006/0288349 A1 * | 12/2006 | Zimmer et al. | 718/107 |

FOREIGN PATENT DOCUMENTS

| | | |
|---|---|---|
| CN | 1075021 A | 8/1993 |
| CN | 1592890 A | 3/2005 |
| TW | 550452 | 9/2003 |

OTHER PUBLICATIONS

[Goo-Xiang Tong, Qi Li, Guang-Jun Li], [Development of multitask appliction program issued on pC/OS-11 embedded OS]. [Opto-Electronic Engineering] , [Dec. 2004], [vol. 31, Sup]. [China Academic Journal Electronic Publishing Housing]. [China].

* cited by examiner

*Primary Examiner*—Thomas Lee
*Assistant Examiner*—Jaweed A Abbaszadeh
(74) *Attorney, Agent, or Firm*—Winston Hsu

(57) ABSTRACT

A computer system and a booting method thereof are disclosed. The computer system contains a storage device for storing a booting system and a multi-tasking kernel; and a microprocessor coupled to the storage device for loading the multi-tasking kernel to execute the booting system.

12 Claims, 9 Drawing Sheets

COMPUTER SYSTEM AND BOOTING METHOD THEREOF

BACKGROUND OF THE INVENTION

1. Field of the Invention

The present invention relates to a computer system and a booting method, and more specifically, to a computer system and a booting method that process EFI events in a multi-tasking manner utilizing a multi-tasking kernel architecture.

2. Description of the Prior Art

A prior art computer system comprises a basic input output system (BIOS) to process a booting procedure; that is, before the computer system loads and executes an operating system (OS), the BIOS takes charge of the initialization of hardware devices utilized by the computer system. For example, the BIOS checks the hardware devices utilized by the computer system to determine if they are in a normal operation condition. The typical BIOS is generated by compiling a program coded in a low level language (e.g., Assembly Language). As is well known in the art, the BIOS is generally stored in a read-only memory (ROM) of a motherboard of the computer system. The main advantage in storing the BIOS this way is that the content of the BIOS is protected from modification. Therefore, the operation of the booting procedure cannot be affected by unprotected BIOS. However, the conventional BIOS has several disadvantages; for example, the conventional BIOS cannot support some of the functions provided for a computer system, such as "plug and play" and "hot plugging", because it needs to adjust hardware device drivers and I/O (Input/Output) resources.

In order to improve the conventional BIOS, the prior art provides an extensible firmware interface (EFI) to replace the current BIOS (i.e., the conventional BIOS). The EFI is based on the conventional BIOS, but the part utilized for engaging the software with the hardware devices of the computer system is further standardized to provide greater expansion functionality as compared to the conventional BIOS. The EFI is coded in an advanced programming language (e.g., the C Programming Language) and it is like a simplified operating system utilized to interface the hardware devices of the computer system and the operating system of the computer system. In addition, compared with the text interface of the conventional BIOS, the EFI provides a user-friendly graphical interface that provides a more practical and operational display mode for users. The operation and functions of the EFI are described in the following paragraph.

During the execution of the booting service of the computer system, the execution of the EFI comprises the following steps: (1) Activate; (2) Initialize a standardized firmware platform; (3) Load the driver function libraries of the EFI and execute the related functions; and (4) Select an operating system from an activation list of the EFI and provide the EFI with an activation guiding code. Afterwards, the selected operating system is loaded and executed thereby completing the entire booting service procedure of the computer system.

However, during the booting service of the computer system, by way of either the conventional BIOS or the above-mentioned EFI, neither can support the multi-tasking processing function. Therefore, for the EFI, when the microprocessor of the computer system, such as a central processing unit (CPU), receives an event with a relatively higher priority level, the microprocessor cannot immediately interrupt the execution of an event currently being processed by the CPU and having a relatively lower priority level. The microprocessor must finish executing the processing event first, and then it is able to execute the event with the relatively higher priority level. In conclusion, the application of EFI is limited because the EFI does not provide a multi-tasking processing mechanism.

SUMMARY OF THE INVENTION

One of the objectives of the claimed invention is therefore to provide a computer system and a booting method that process EFI events in a multi-tasking manner by adopting a multi-tasking kernel architecture, in order to resolve the above-mentioned problem.

The present invention provides a computer system capable of processing EFI events in a multi-tasking manner. The computer system comprises: a storage device for storing a booting system and a multi-tasking kernel; and a microprocessor, coupled to the storage device, for loading the multi-tasking kernel to execute the booting system.

In addition, the claimed invention provides a booting method for processing EFI events in a multi-tasking manner. The booting method comprises: providing a multi-tasking kernel; and loading the multi-tasking kernel to execute the booting system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
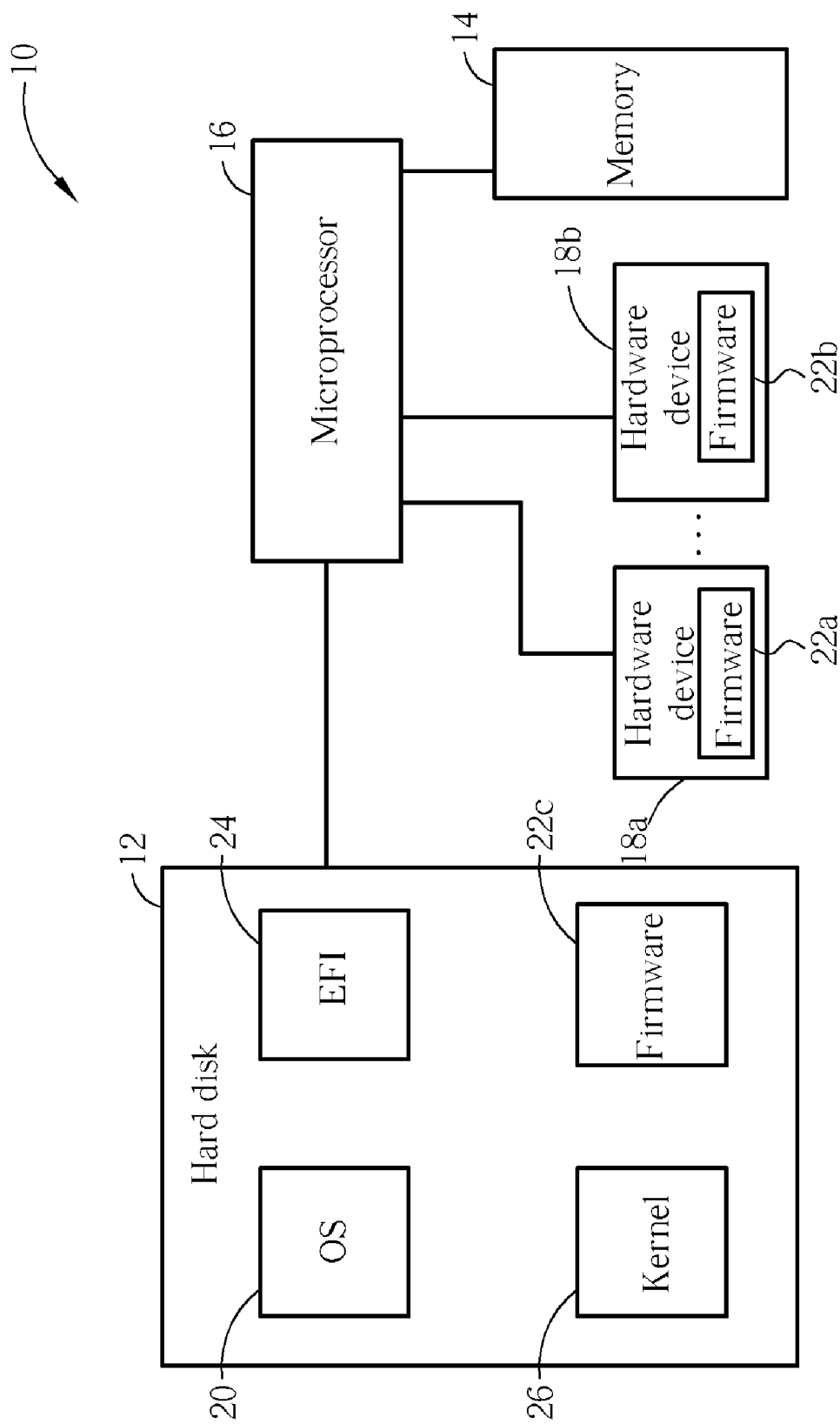
FIG. 1 is a functional block diagram of a computer system according to the present invention.

Please refer to FIG. 1. FIG. 1 is a functional block diagram of a computer system 10 according to the present invention. The computer system 10 comprises a hard disk 12, a memory 14, a microprocessor (i.e., a CPU) 16 and a plurality of other hardware devices 18a and 18b (e.g., an optical disc drive or a display card). For convenience and brevity, there are only two hardware devices, 18a and 18b, shown in FIG. 1. The hard disk 12 and the memory 14 are utilized as storage devices of the computer system 10, wherein the hard disk 12 stores an operating system (OS) 20, an extensible firmware interface (EFI) 24, a firmware 22 and a real-time operating system kernel (e.g., a µC/OS-II kernel) 26. The memory 14 is utilized for providing a storage space to temporarily store data. The microprocessor 16 is coupled to the hard disk 12, the memory 14 and the hardware devices 18a and 18b. When the computer system 10 executes a booting procedure, the microprocessor 16 reads the kernel 26 and the EFI 24 from the hard disk 12 and then loads the kernel 26 and the EFI 24 into the memory 14. Next, the microprocessor 16 reads and then executes the kernel 26 and the EFI 24 from the memory 14. In the later part of the booting procedure, the microprocessor 16 reads the operating system 20 from the hard disk 12 and then loads the operating system 20 into the memory 14. Finally, the microprocessor 16 reads the operating system 20 from the memory 14 and executes it to complete the entire booting procedure. Please note that as mentioned above, the EFI 24 is a single-tasking booting system utilized as a communication medium between the operating system 20 and firmware 22a, 22b, 22c of the hardware devices 18a, 18b and the hard disk 12. In the disclosed embodiment according to the present invention, the kernel 26 conforming to the μC/OS-II architecture is a multi-tasking kernel. It should be noted that any computer architecture using a multi-tasking kernel to execute a single-tasking booting system is covered by the present invention, and the EFI 24 and the kernel 26 conforming to the μC/OS-II architecture are utilized in a preferred embodiment.

During the booting service process, when the microprocessor 16 executes the EFI 24, it generates a plurality of events that must be processed with different priority levels. Each event corresponds to a specific priority level. In the present embodiment, there are four priority levels wherein the first priority level is the highest priority level and is referred to as the TPL_HIGH_LEVEL. The second priority level is referred to as the TPL_NOTIFY level and has less priority than the first level. The third priority level is referred to as the TPL_CALLBACK level and has less priority than the second level. The fourth and final priority level is referred to as the TPL_APPLICATION level and has less priority than the third level (i.e., the fourth level has the least amount of priority).

Figure 2:
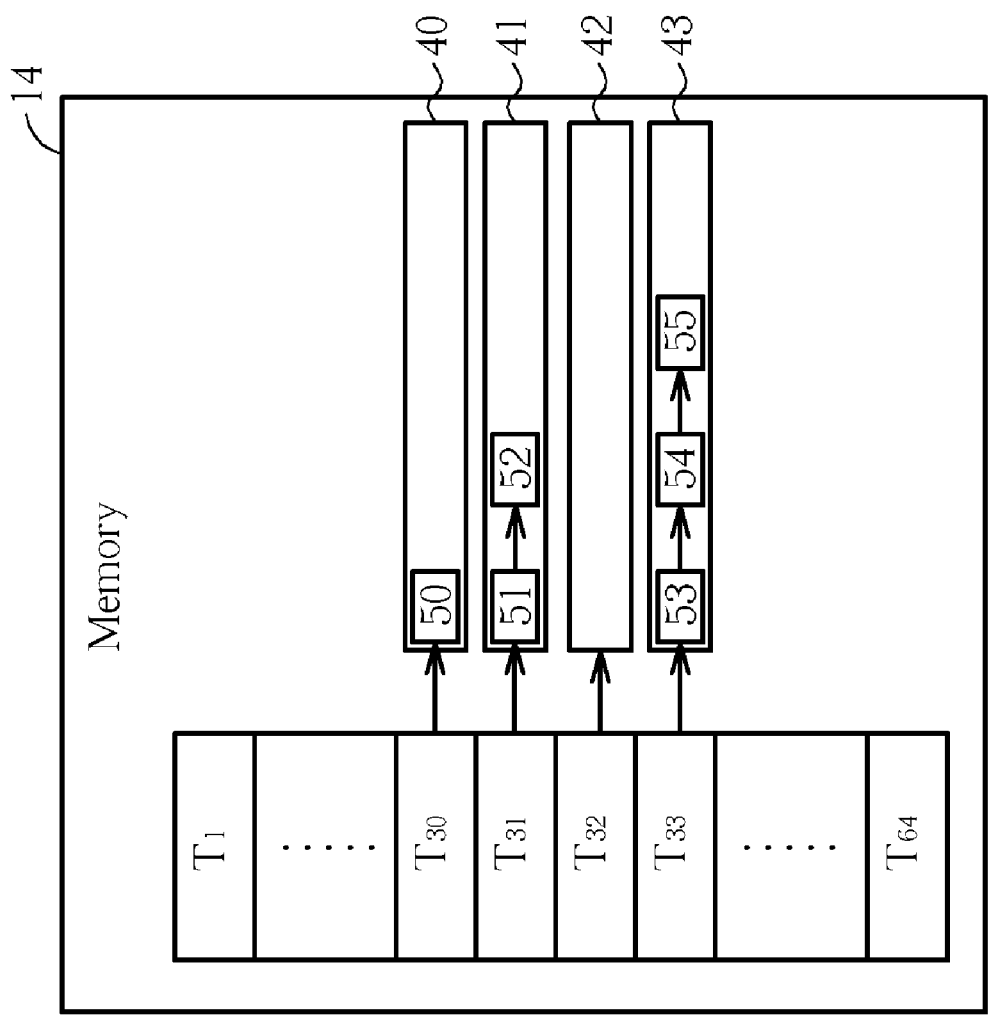
FIG. 2 is a diagram of a plurality of queues in the memory shown in FIG. 1.

Please refer to FIG. 2. FIG. 2 is a diagram of a plurality of queues 40, 41, 42, 43 in the memory 14 shown in FIG. 1. As mentioned previously, the kernel 26 includes a multi-tasking processing function and conforms to a μC/OS-II architecture. According to the μC/OS-II architecture, the microprocessor 16 executes the kernel 26 and generates 64 tasks $T_1$~$T_{64}$ in the memory 14, wherein the 64 tasks $T_1$~$T_{64}$ correspond to 64 different priority levels, respectively. Wherein, the tasks $T_{30}$, $T_{31}$, $T_{32}$, $T_{33}$ point to the four queues 40, 41, 42, 43, respectively. The queue 40 is utilized for storing events with the highest priority level TPL_HIGH_LEVEL, such as the event 50 shown in FIG. 2. The queue 41 is utilized for storing events with the second highest priority level TPL_NOTIFY, such as the events 51, 52 shown in FIG. 2. The queue 42 is utilized for storing events with the second lowest priority level TPL_CALLBACK. In FIG. 2, the queue 42 is empty without storing any event. The queue 43 is utilized for storing events with the lowest priority level TPL_APPLICATION, such as the events 53, 54 and 55 shown in FIG. 2.

Instead of directly utilizing the 64 tasks to store events, in the present embodiment, the four queues 40, 41, 42, and 43 are pointed to by the tasks $T_{30}$, $T_{31}$, $T_{32}$, $T_{33}$ and are utilized for storing events. According to the aforementioned design, more events can be temporarily stored, and the utilization of space becomes more flexible. Additionally, the queue 42 is suspended because no event is stored in the queue 42 until the microprocessor 16 receives an event that corresponds to the second lowest priority level TPL_CALLBACK and which said event cannot be processed immediately. The queue 42 is then resumed, and the event is stored into the queue 42. Please note that there are many ways to suspend a queue. One of the ways is for the microprocessor 16 to set each queue 40, 41, 42, 43 to correspond to a tag S, respectively. (e.g., the microprocessor 16 assigns a tag S to each queue 40, 41, 42, and 43, respectively). In this way, the microprocessor 16 can determine if the queues 40, 41, 42, 43 have been suspended by checking each queue's respective tag S. For example, the microprocessor 16 first sets the tags S of the queues 40, 41, 42, 43 to be 0, respectively. When the queue 42 is suspended because it does not store any event, the microprocessor 16 sets the tag S of the queue 42 to be 1. Afterwards, when the microprocessor 16 processes events stored in the queues, it knows that the queue 42 has been suspended and stores no event by the value 1 of the tag S.

The queues 40, 41, 42, 43 utilize a mechanism of "First In First Out" (i.e., FIFO). In this way, when the microprocessor 16 processes the events 53, 54, 55 sequentially stored in the same queue 43 (please note that this also indicates that the events 53, 54, 55 correspond to the same priority level), if the microprocessor 16 does not receive an incoming event with a relatively higher priority level, the execution order of the events 53, 54, 55 are the same as the order of the events 53, 54, 55 being stored in the queue 43. That is, the microprocessor 16 processes the event 53, then the event 54, and finally the event 55. The execution order of events with different priority levels will be illustrated with a following example. The microprocessor 16 sequentially processes events stored in the four queues 40, 41, 42, and 43 according to the priority levels and from the highest priority level to the lowest level. In other words, after the events stored in the queue corresponding to a relatively higher priority level have been processed, the microprocessor 16 then processes the events stored in the queue corresponding to relatively lower priority, and so on. In this way, for the events 50, 51, 52, 53, 54 and 55 shown in FIG. 2, under a normal operation, the order of the microprocessor 16 processing the above-mentioned events is: event 50, event 51, event 52, event 53, event 54, and finally event 55.

Figure 3:
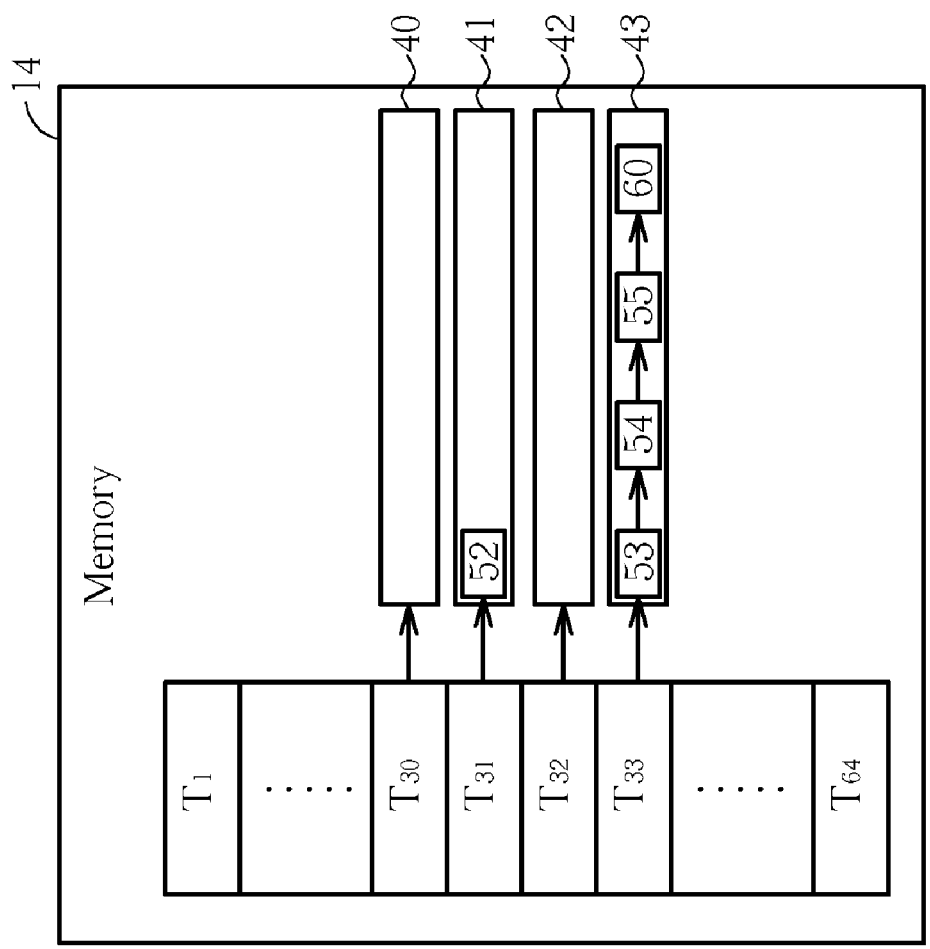
FIG. 3 through FIG. 6 are diagrams of different operational statuses of the memory shown in FIG. 2.
Figure 4:
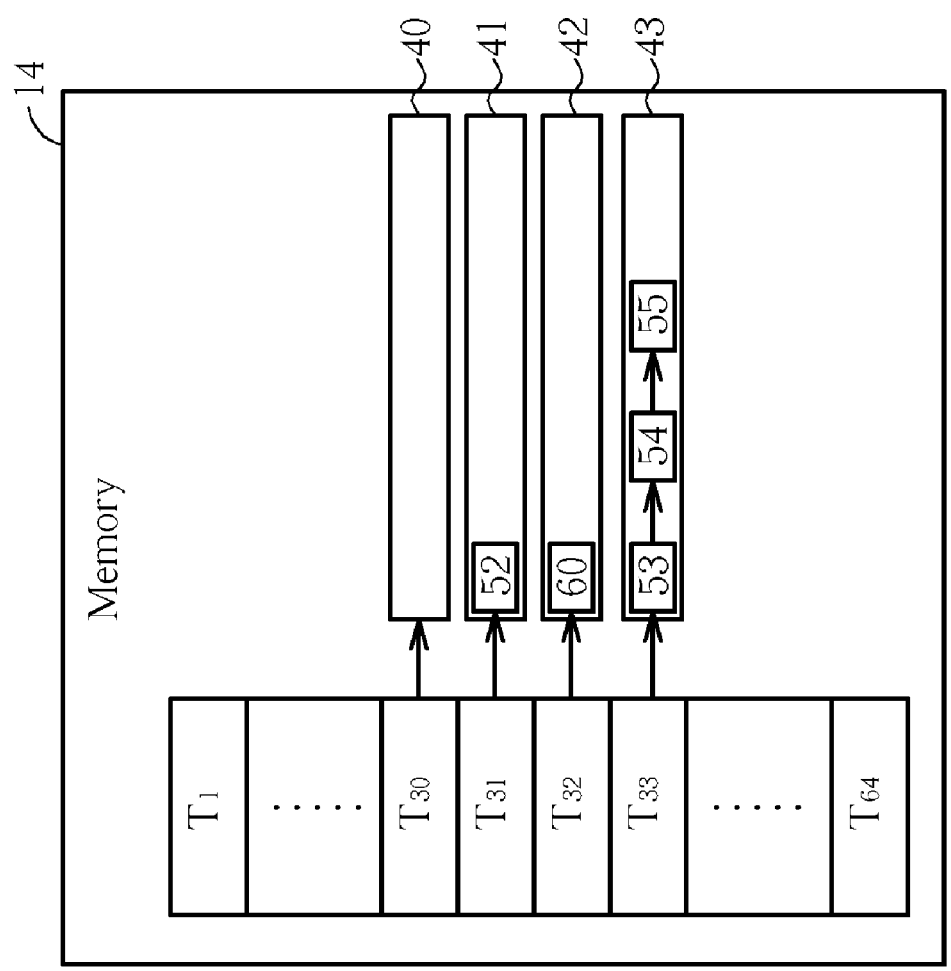
Figure 5:
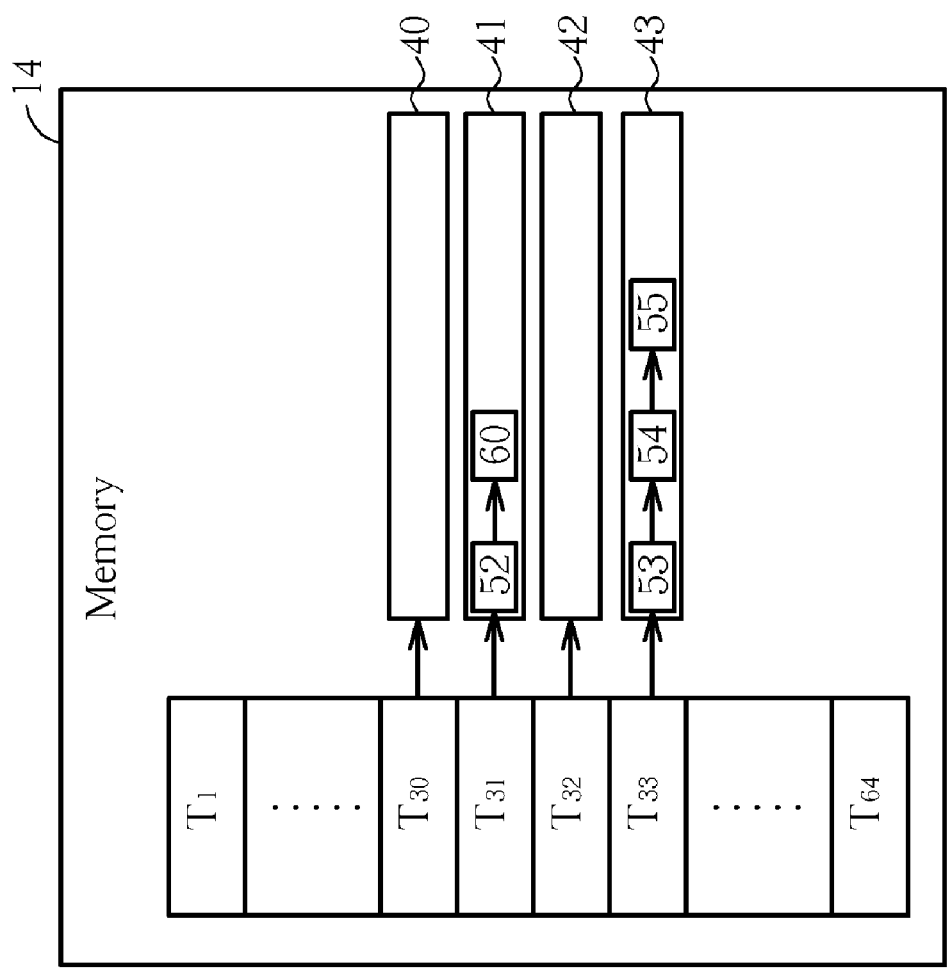
Figure 6:
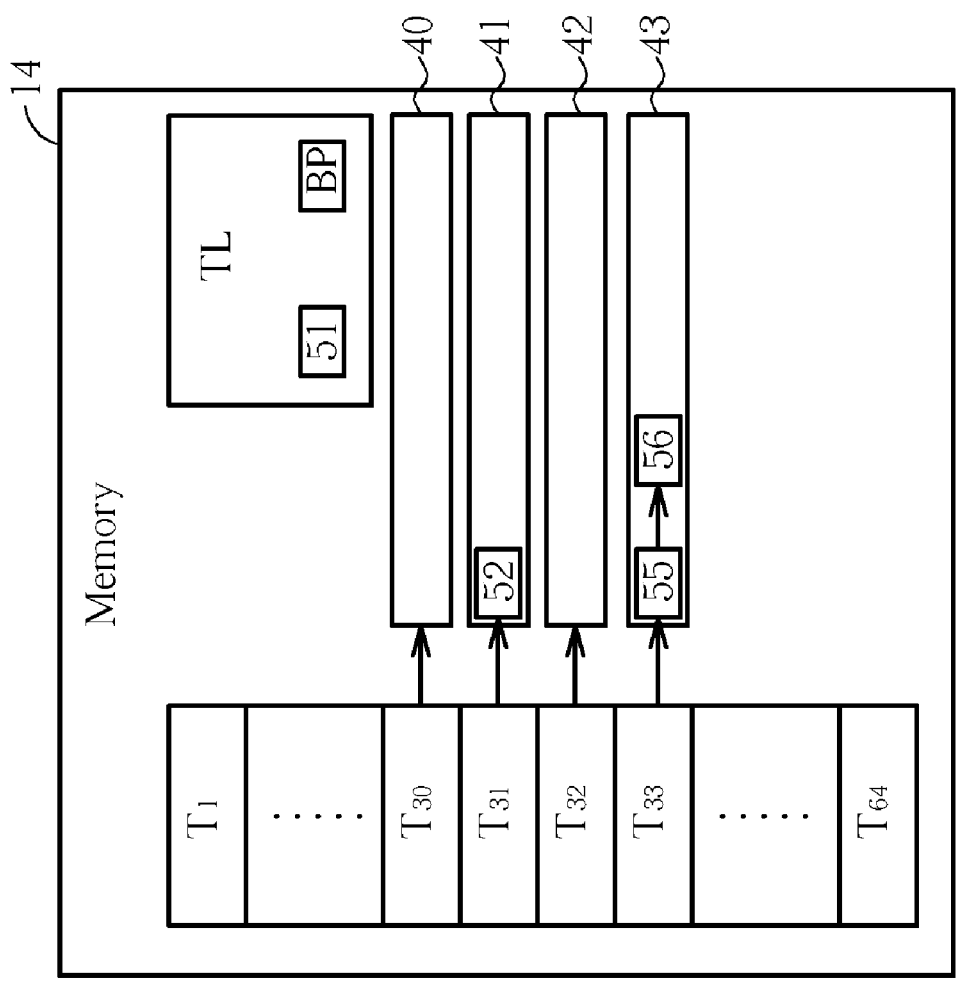

Please refer to FIG. 2 through FIG. 6 that illustrate the process procedure of the microprocessor 16 receiving a break event when the microprocessor 16 is executing a processing event. FIG. 3 through FIG. 6 are diagrams of different operational statuses of the memory 14 shown in FIG. 2. After the microprocessor 16 finishes processing the event 50 and suspends the queue 40, the microprocessor 16 reads and processes the event 51 with a second highest priority level TPL_NOTIFY. The microprocessor 16 then receives a break event 60 when it is processing the event 51. At this time, if the event 60 corresponds to a priority level (i.e., TPL_APPLICATION) relatively lower than the priority level of the event 51, the event 60 will be stored in the queue 43 corresponding to the priority level TPL_APPLICATION, and the event 60 will be processed will be later than the stored event 55, as shown in FIG. 3. FIG. 3 is a diagram of the current operational status of the memory 14. If the event 60 corresponds to the priority level TPL_CALLBACK which is lower than the priority level TPL_NOTIFY of the queue 51 and the queue 42 corresponding to the priority level TPL_CALLBACK is suspended because there is no event stored in the queue 42, the queue 42 is resumed and the event 60 is then stored in the queue 42, as shown in FIG. 4. FIG. 4 is a diagram of the current operational status of the memory 14. If the events 60 and 51 correspond to the same second highest priority level TPL_NOTIFY, the event 60 will be stored in the queue 41 and will be processed later than the previously stored event 52, as shown in FIG. 5. FIG. 5 is a diagram of the current operational status of the memory 14. If the event 60 corresponds to the highest priority level TPL_HIGH_LEVEL that is higher than the second highest priority level TPL_NOTIFY of the event 51, the microprocessor 16 interrupts the execution of the processing event 51 and immediately processes the event 60. The interrupted event 51 and a related break point BP are temporarily stored in the memory 14 at an address TL; at this time, the current operational status of the memory 14 is shown in FIG. 6. After the microprocessor 16 has processed the event 60, the microprocessor 16 reads the event 51 and the break point BP from the memory 14 at the address TL, and then processes the event 51 from the break point BP. That is the above-mentioned multi-tasking processing operation.

When the microprocessor 16 constantly receives and processes events with a relatively higher priority level, or constantly processes events stored in a queue corresponding to a relatively higher priority level, there may be a period of time in which events corresponding to a relatively lower priority level may not be processed. In order to resolve the above-mentioned problem, a masking mechanism disclosed in the present invention is utilized for providing an operation similar to another operation of temporarily raising the priority level of an event (of a lower priority level). The operation allows the microprocessor 16 to adjust the execution order of events. After the microprocessor 16 processes a processing event and is in a situation in which the microprocessor 16 has activated a masking mechanism, the microprocessor 16 skips events corresponding to a second priority level (that is lower than the priority level of the processing event) to process events corresponding to a third priority level, wherein the second priority level is higher than the third priority level). Please refer to a following example for a detailed description of the operation of the masking mechanism.

Figure 7:
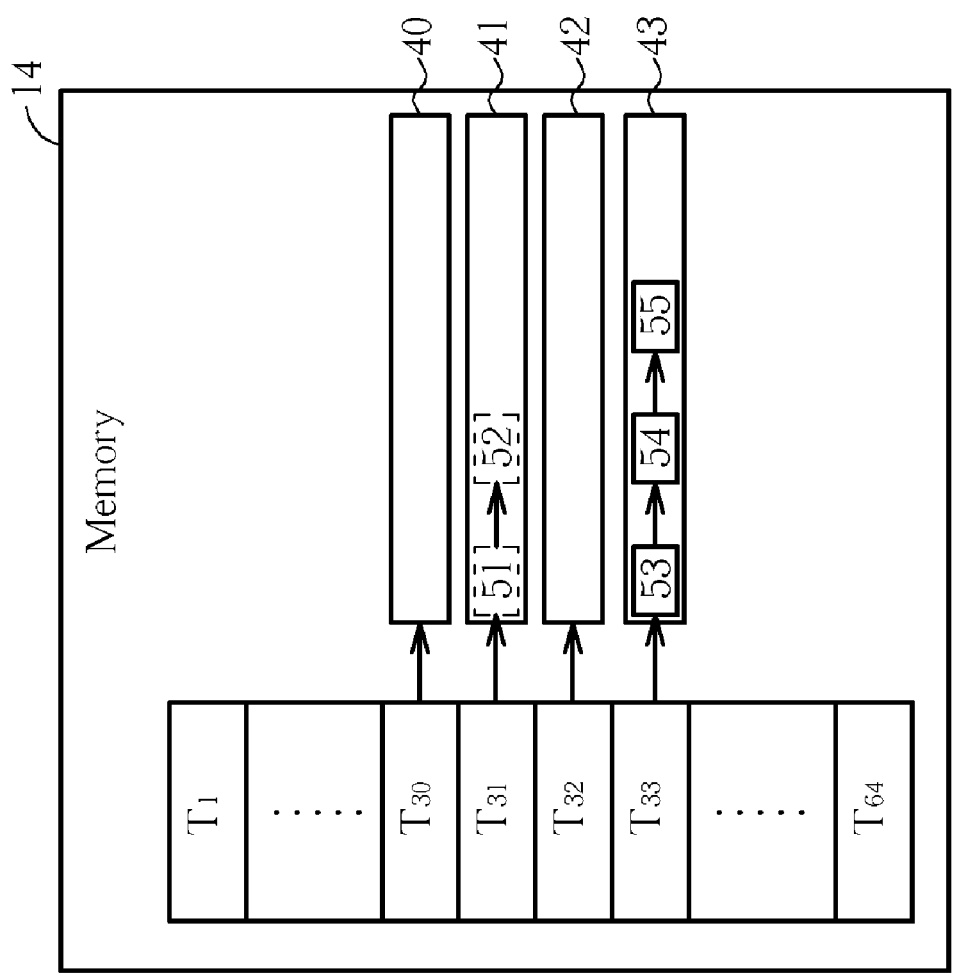
FIG. 7 is a diagram of an operational status of the memory shown in FIG. 2 when the microprocessor has activated a masking mechanism.

Please refer to FIG. 2 and FIG. 7. FIG. 7 is a diagram of an operational status of the memory 14 shown in FIG. 2 when the microprocessor 16 has activated a masking mechanism. As shown in FIG. 2, when the microprocessor 16 reads the event 50 from the queue 40 and processes the event 50, if the queue 40 currently stores no event and the microprocessor 16 does not receive and process any new event, the microprocessor 16 sequentially processes the events 51, 52, 53, 54, and 55. However, it is required that the microprocessor 16 processes the event 53 directly after the execution of the processing event 50 is finished. At this time, the microprocessor 16 needs to activate the masking mechanism to mask all other events that need to be processed and correspond to the priority levels higher than the lowest priority level TPL_APPLICATION of the event 53. That is, the microprocessor 16 needs to mask the events 51 and 52 stored in the mask queue 41. The current operational status of the memory 14 is shown in FIG. 7. The queues 40 and 42 in the present embodiment have been suspended because there is no event stored in them, so the microprocessor 16 does not need to mask the queues 40 and 42. Please note that there are many ways to mask a queue. One of the ways is that the microprocessor 16 sets each queue 40, 41, 42, 43 to correspond to a tag M, respectively. (e.g., the microprocessor 16 assigns a tag M to each queue 40, 41, 42, and 43, respectively). The microprocessor 16 sets the tags M of the queue 40, 41, 42, and 43 to be 0, respectively. The microprocessor 16 masks the queue 41 by setting the tag M of the queue 41 to be 1. In this way, after the microprocessor 16 finishes processing the event 50, the microprocessor 16 checks the value of tag M of the queue 41 and knows that the queue 41 has been masked because the value 1 of the tag M of the queue 41. The microprocessor 16 then skips the events 51, 52 stored in the queue 41 and directly processes the event 53. Another example is given for an advanced description. When the value of the tag S of the queue 40, the tag M of the queue 41 and the tag S of the queue 42 are all 1, the microprocessor 16 knows that it can directly read the event 53 from the queue 43 and process the event 53 without reading the queues 40, 41 and 42.

Figure 8:
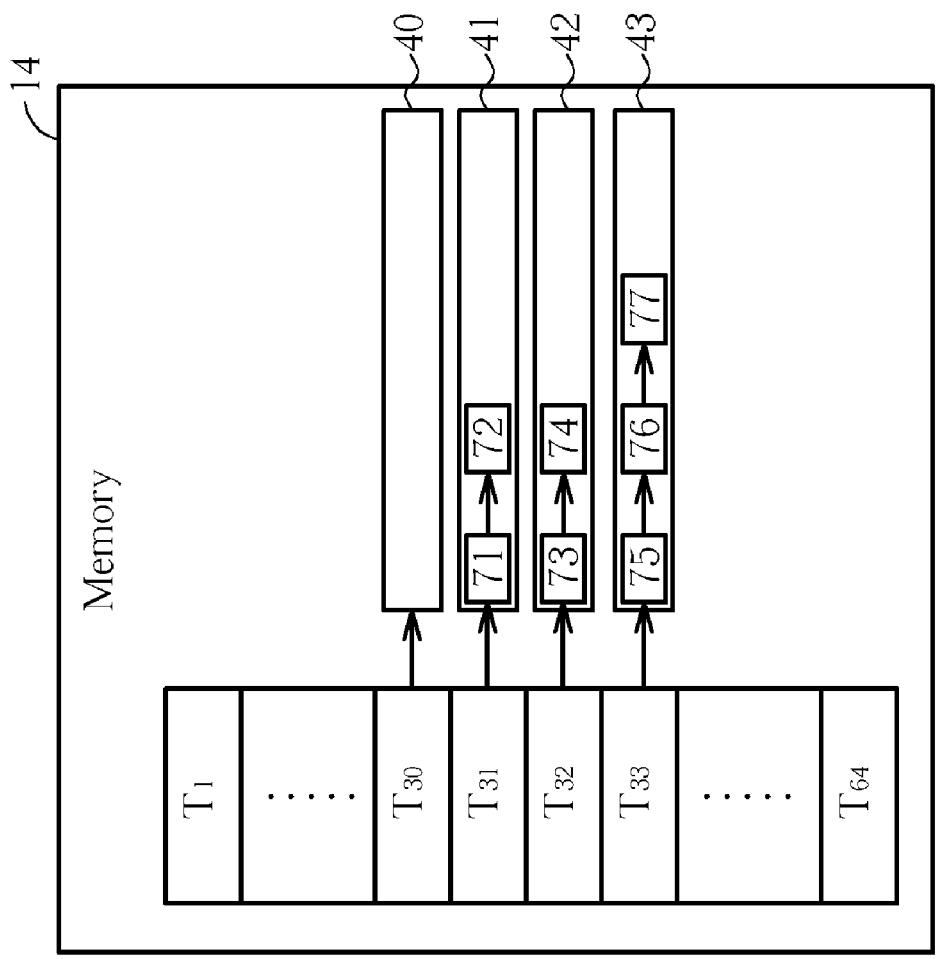
FIG. 8 is another diagram of the queues of the memory shown in FIG. 2.
Figure 9:
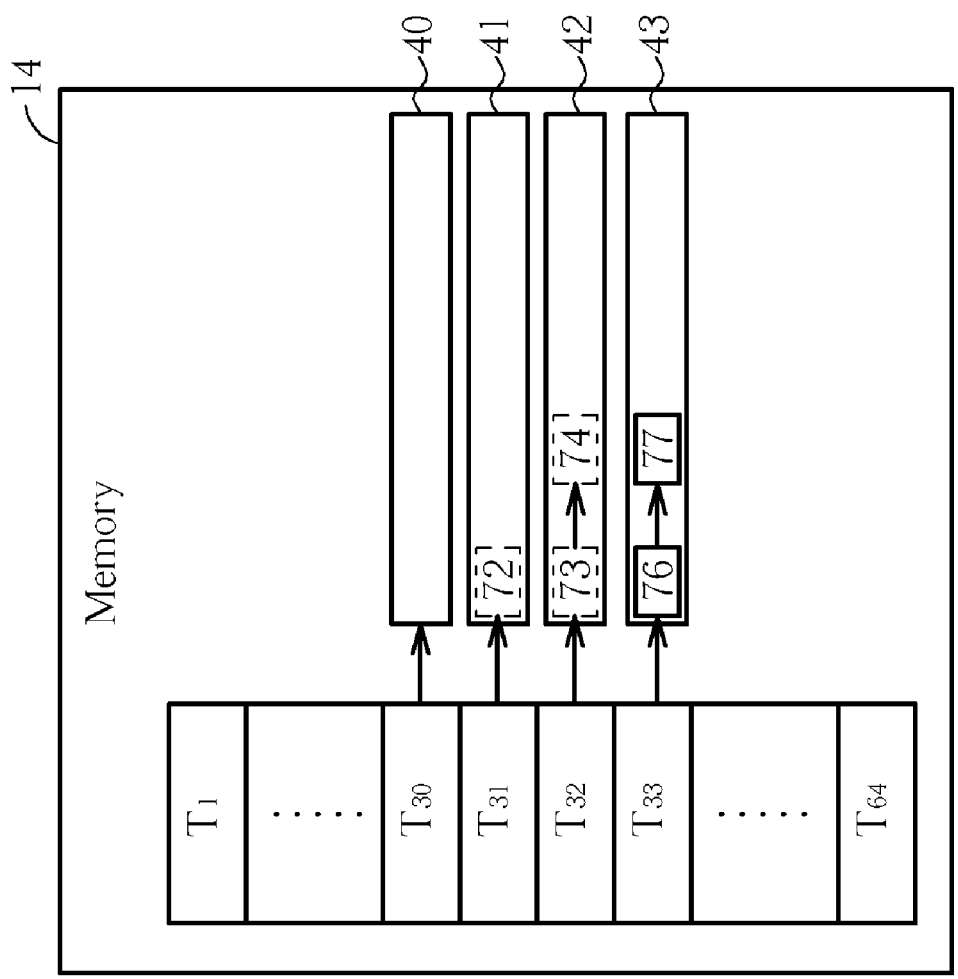
FIG. 9 is a diagram of an operational status of the memory shown in FIG. 8 when the microprocessor has activated a masking mechanism.

Please refer to FIG. 8 and FIG. 9. FIG. 8 is another diagram of the queues 40, 41, 42, and 43 of the memory 14 shown in FIG. 2. FIG. 9 is a diagram of an operational status of the memory 14 shown in FIG. 8 after the microprocessor 16 activates a masking mechanism. In FIG. 8, the queue 40 is suspended because there is no event stored in the queue 40. The queue 41 stores the events 71 and 72, the queue 42 stores the events 73 and 74, and the queue 43 stores the events 75, 76, and 77. The microprocessor 16 reads the event 71 from the queue 41 and processes the event 71. Next, in a situation in which the microprocessor 16 does not receive and process new events, the microprocessor 16 sequentially processes the events 72, 73, 74, 75, 76 and 77 in a general situation. However, now it is required that the microprocessor 16 processes the event 75 right after finishing executing the processing event 71. The microprocessor 16 needs to mask all events corresponding to relatively higher priority levels higher than the priority level TPL_APPLICATION of the event 75; that means, the microprocessor 16 needs to mask the events 72, 73, and 74 stored in the queues 41 and 42. The current operational status of the memory 14 is shown in FIG. 9.

As mentioned above, the computer system and the booting method according to the present invention activate the above-mentioned multi-tasking mechanism to process events with different priority levels when a booting procedure is being executed. In this way, when the microprocessor of the computer system receives an event with a relatively higher priority level, the microprocessor can intermediately interrupt the processing of a processing event with a relatively lower priority level and then intermediately interrupt processing the event with the relatively higher priority level. In contrast to the prior art, the computer system and the booting method can process more events because of the utilization of queues. In addition, the computer system and the booting method according to the present invention provide a masking mechanism to process an event earlier than the predetermined time by temporarily raising the priority level of the event.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer system, comprising:
   a storage device storing a booting system and a multi-tasking kernel; and
   a microprocessor, coupled to the storage device, for loading the multi-tasking kernel to execute the booting system;
   wherein a plurality of queues are created by the microprocessor and stored in the storage device, and the queues respectively corresponding to different priority levels are utilized for storing a plurality of events, when a break event having a higher priority than a processing event is received during an execution of the processing event, a break point for indicating interruption of the processing event is generated and the execution of the processing event is suspended, then the break event is executed and the execution of the processing event is resumed after the break event is executed according to the break point, and the microprocessor activates a masking mechanism to mask an event with a relatively higher priority level to process an event with a relatively lower priority level.

2. The computer system of claim 1, wherein the event is removed from the queue by the microprocessor after the event has been processed.

3. The computer system of claim 1, wherein the empty queue is suspended by the microprocessor.

4. The computer system of claim 1, wherein when the microprocessor activates the masking mechanism, the event with the relatively lower priority level is processed after the execution of a previously processing event is finished.

5. The computer system of claim 1, wherein the multi-tasking kernel conforms to a μC/OS-II kernel architecture, the queues are corresponding to the events conforming to the kernel architecture.

6. The computer system of claim 1, wherein the booting system is an extensible firmware interface (EFI).

7. A booting method applied to a computer system, the computer system comprising a booting system, the booting method comprising:
providing a multi-tasking kernel;
loading the multi-tasking kernel to execute the booting system;
creating a plurality of queues respectively with different priority levels for storing a plurality of events;
suspending an execution of a processing event when a break event having a higher priority than the processing event is received;
generating a break point to indicate interruption of the processing event;
executing the break event;
resuming the execution of the processing event after the break event is executed according to the break point; and
activating a masking mechanism to mask an event with a relatively higher priority level to process an event with a relatively lower priority level.

8. The booting method of claim 7, further comprising:
removing the event from the queue after the event has been processed.

9. The booting method of claim 7, further comprising:
suspending the empty queue.

10. The booting method of claim 7, further comprising:
when the microprocessor activates the masking mechanism, processing the event with the relatively lower priority level after the execution of a previously processing event is finished.

11. The booting method of claim 7, wherein the multi-tasking kernel conforms to a μC/OS-II kernel architecture, the queues are corresponding to the events conforming to the kernel architecture.

12. The booting method of claim 7, wherein the booting system is an extensible firmware interface (EFI).

* * * * *